(12) United States Patent
Iglewski

(10) Patent No.: US 11,078,870 B2
(45) Date of Patent: Aug. 3, 2021

(54) METHOD AND SYSTEM FOR A STOWABLE BELL-MOUTH SCOOP

(71) Applicant: General Electric Company, Schenectady, NY (US)

(72) Inventor: Tomasz Iglewski, Warsaw (PL)

(73) Assignee: General Electric Company, Schenectady, NY (US)

( * ) Notice: Subject to any disclaimer, the term of this patent is extended or adjusted under 35 U.S.C. 154(b) by 218 days.

(21) Appl. No.: 16/311,313

(22) PCT Filed: Jul. 4, 2017

(86) PCT No.: PCT/PL2017/050037
§ 371 (c)(1),
(2) Date: Dec. 19, 2018

(87) PCT Pub. No.: WO2018/009084
PCT Pub. Date: Jan. 11, 2018

(65) Prior Publication Data
US 2020/0182193 A1 Jun. 11, 2020

(30) Foreign Application Priority Data

Jul. 4, 2016 (PL) .......................... 417832

(51) Int. Cl.
*F02K 1/70* (2006.01)
*B64C 9/32* (2006.01)
(Continued)

(52) U.S. Cl.
CPC .................. *F02K 1/70* (2013.01); *B64C 9/32* (2013.01); *B64C 9/36* (2013.01); *F02K 3/06* (2013.01);
(Continued)

(58) Field of Classification Search
CPC ..... F02C 9/16; F02K 1/09; F02K 1/10; F02K 1/12; F02K 1/30; F02K 1/32; F02K 1/34;
(Continued)

(56) References Cited

U.S. PATENT DOCUMENTS 2,934,892 A * 5/1960 Hurlbert .................... F02K 1/10
239/265.39
3,074,232 A 1/1963 Soyer
(Continued)

FOREIGN PATENT DOCUMENTS

EP 0561791 A 6/1992
EP 1515035 A2 9/2003
(Continued)

OTHER PUBLICATIONS

Polish Prior Art Report dated Sep. 4, 2017 which was issued in connection with Polish Application No. P-417832 which was filed on Jul. 4, 2016.
(Continued)

*Primary Examiner* — Craig Kim
(74) *Attorney, Agent, or Firm* — Dority & Manning, P.A.

(57) ABSTRACT

A bell-mouth scoop assembly includes an actuator comprising a plurality of hinge members configured to rotate in unison about a respective hinge axis of rotation from a first stowed position to a second deployed position and at least one linkage arm extending outwardly from at least one of the plurality of hinge members. The bell-mouth scoop assembly further comprises a bell-mouth panel comprising a panel longitudinal centerline and pivotably coupled to each linkage arm, in the first stowed position the bell-mouth panel configured to conform to an outer surface of the with the panel longitudinal centerline aligned about a circumference of the flow discharge nozzle, in the second deployed position the bell-mouth panel configured to extend away from the
(Continued)

outer surface of the flow discharge nozzle with the longitudinal centerline aligned parallelly with the nozzle centerline.

17 Claims, 14 Drawing Sheets

(51) Int. Cl.
*B64C 9/36* (2006.01)
*F02K 3/06* (2006.01)

(52) U.S. Cl.
CPC .. *F05D 2220/323* (2013.01); *F05D 2240/128* (2013.01); *F05D 2240/14* (2013.01)

(58) Field of Classification Search
CPC ..... F02K 1/42; F02K 1/52; F02K 1/54; F02K 1/56; F02K 1/64; F02K 1/70
See application file for complete search history.

(56) References Cited

U.S. PATENT DOCUMENTS

| | | | |
|---|---|---|---|
| 3,130,941 A | 4/1964 | Pazmany | |
| 3,242,671 A | 3/1966 | Moorehead | |
| 3,285,003 A | 11/1966 | Martin et al. | |
| 3,494,380 A | 2/1970 | Martin | |
| 3,604,663 A | 9/1971 | Custer | |
| 3,770,228 A | 11/1973 | Traksel et al. | |
| 4,012,013 A | 3/1977 | Ball et al. | |
| 4,132,068 A * | 1/1979 | Johnston | F02K 1/805 239/265.39 |
| 5,120,005 A * | 6/1992 | Reedy | B64C 9/32 244/113 |
| 5,190,245 A | 3/1993 | Debeneix | |
| 5,329,763 A * | 7/1994 | Ibarreche Mendia | F02K 1/008 239/265.35 |
| 5,364,029 A * | 11/1994 | Barcza | F02K 1/1223 239/127.3 |
| 5,782,432 A * | 7/1998 | Renshaw | B64D 33/04 239/265.19 |
| 6,293,495 B1 | 9/2001 | Aten et al. | |
| 7,093,423 B2 * | 8/2006 | Gowda | F02K 1/48 239/265.43 |
| 7,721,549 B2 | 5/2010 | Baran | |
| 9,133,790 B2 * | 9/2015 | Pitiot | F02K 1/64 |
| 2015/0211444 A1 | 7/2015 | Suciu et al. | |
| 2016/0009372 A1 | 1/2016 | Grip et al. | |

FOREIGN PATENT DOCUMENTS

| | | |
|---|---|---|
| EP | 3023623 A1 | 5/2016 |
| FR | 2247621 A1 | 5/1975 |
| GB | 1479148 A | 7/1977 |
| WO | 9308397 A1 | 4/1993 |

OTHER PUBLICATIONS

International Search Report Corresponding to Application No. PCT/PL2017/050037 dated Oct. 23, 2017.

* cited by examiner

METHOD AND SYSTEM FOR A STOWABLE BELL-MOUTH SCOOP

BACKGROUND

The field of the disclosure relates generally to gas ducts and, more particularly, to a method and system for an intermittently used tapered expanding or reducing opening in the end of a duct that is stowable when not in use.

At least some known gas turbine engines used to propel aircraft have variable pitch fan blades that can be used to reverse the thrust generated by the gas turbine engine during, for example, landing to assist in slowing the aircraft down from a landing speed to a taxiing speed.

During the reverse thrust operation, air is drawn into the bypass fan flow discharge nozzle opening. The bypass fan duct and the bypass fan flow discharge nozzle opening are typically designed for most efficient operation during operating conditions where the fan is providing forward thrust, for example, during takeoff and cruise conditions. Consequently, the bypass fan flow discharge nozzle opening has a sharp edge that facilitates an efficient flow profile from fore to aft at the bypass fan flow discharge nozzle opening. However, in a reverse thrust operating condition, air being drawn into the bypass fan flow discharge nozzle opening tends to separate from the sharp edge at the bypass fan flow discharge nozzle opening, which tends to disrupt flow through the bypass fan duct in the reverse direction, thereby limiting the effectiveness of the reverse thrust capability of the gas turbine engine.

BRIEF DESCRIPTION

In one aspect, a bell-mouth scoop assembly for a flow discharge nozzle opening including a flow discharge nozzle centerline includes an actuator comprising a plurality of hinge members configured to rotate in unison about a respective hinge axis of rotation from a first stowed position to a second deployed position and at least one linkage arm extending outwardly from at least one of the plurality of hinge members. The bell-mouth scoop further comprises a bell-mouth panel comprising a panel longitudinal centerline and pivotably coupled to each linkage arm, in the first stowed position the bell-mouth panel configured to conform to an outer surface of the flow discharge nozzle with the panel longitudinal centerline aligned about a circumference of the flow discharge nozzle, in the second deployed position the bell-mouth panel configured to extend away from the outer surface of the flow discharge nozzle with the panel longitudinal centerline aligned parallelly with the flow discharge nozzle centerline.

In another aspect, a turbofan engine includes a core turbine engine configured to generate a stream of high energy exhaust gases, a fan powered by a power turbine driven by the high energy exhaust gases, a fan bypass duct at least partially surrounding the core turbine engine and the fan and a bell-mouth scoop assembly coupled to an aft end of the fan bypass duct. The bell-mouth scoop assembly comprising a plurality of hinge members configured to rotate in unison about a respective hinge axis of rotation from a first stowed position to a second deployed position, at least one linkage arm extending outwardly from at least one of the plurality of hinge members, the linkage arm comprising a first hinge connection end, a second panel connection end, and a body extending therebetween, and a bell-mouth panel comprising a panel longitudinal centerline and pivotably coupled to each at least one linkage arm, in the first stowed position the bell-mouth panel configured to conform to an outer surface of the fan bypass duct with the panel longitudinal centerline aligned about a circumference of the fan bypass duct, in the second deployed position the bell-mouth panel configured to extend away from the outer surface of the fan bypass duct with the panel longitudinal centerline aligned parallelly with a rotational axis of the engine.

In yet another aspect, a method of deploying a foldable bell-mouth scoop including a plurality of foldable panels that when stowed form an overlapping circumferential band of foldable panels about a duct having a duct opening and when deployed form a bell-mouth about the opening is provided. The method includes rotating a hinge member coupled to at least one linkage arm of a plurality of linkage arms, the at least one linkage arm coupled to at least one foldable panel of the plurality of foldable panels, and revolving the plurality of foldable panels in unison about a respective axis of each of the plurality of foldable panels while translating the plurality of foldable panels through an arcuate path from a first stowage position to a second deployed position.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the terms "axial" and "axially" refer to directions and orientations that extend substantially parallel to a centerline of a nozzle or an axis of rotation of the turbine engine. Moreover, the terms "radial" and "radially" refer to directions and orientations that extend substantially perpendicular to the centerline of the nozzle or the axis of rotation of the turbine engine. In addition, as used herein, the terms "circumferential" and "circumferentially" refer to directions and orientations that extend arcuately about the centerline of the nozzle or the axis of rotation of the turbine engine.

Embodiments of a stowable tapered expanding opening in the end of a duct, such as, but not limited to, a bell-mouth scoop described herein provide a cost-effective method for facilitating aerodynamic flow in a reverse direction through a fan duct. More particularly, when deployed in a reverse flow operating condition the stowable bell-mouth scoop facilitates reducing a separation of the flow entering the flow discharge nozzle opening of the gas turbine engine.

Figure 1:
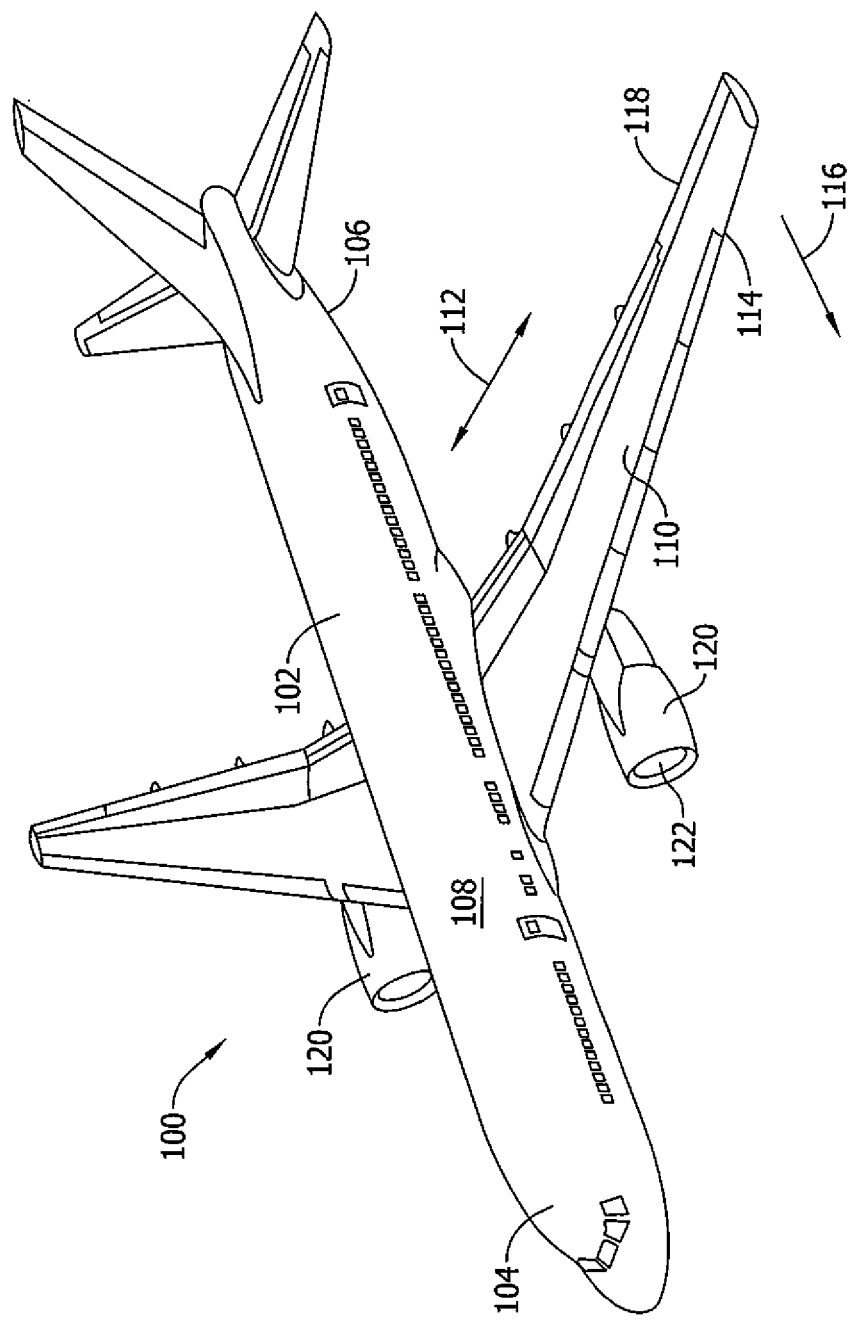
FIG. 1 is a perspective view of an aircraft.

FIG. 1 is a perspective view of an aircraft 100. In the example embodiment, aircraft 100 includes a fuselage 102 that includes a nose 104, a tail 106, and a hollow, elongate body 108 extending therebetween. Aircraft 100 also includes a wing 110 extending away from fuselage 102 in a lateral direction 112. Wing 110 includes a forward leading edge 114 in a direction 116 of motion of aircraft 100 during normal flight and an aft trailing edge 118 on an opposing edge of wing 110. Aircraft 100 further includes at least one engine 120 configured to drive a bladed rotatable member 122 or fan to generate thrust. Engine 120 is coupled to at least one of wing 110 and fuselage 102, for example, in a pusher configuration (not shown) proximate tail 106.

Figure 2:
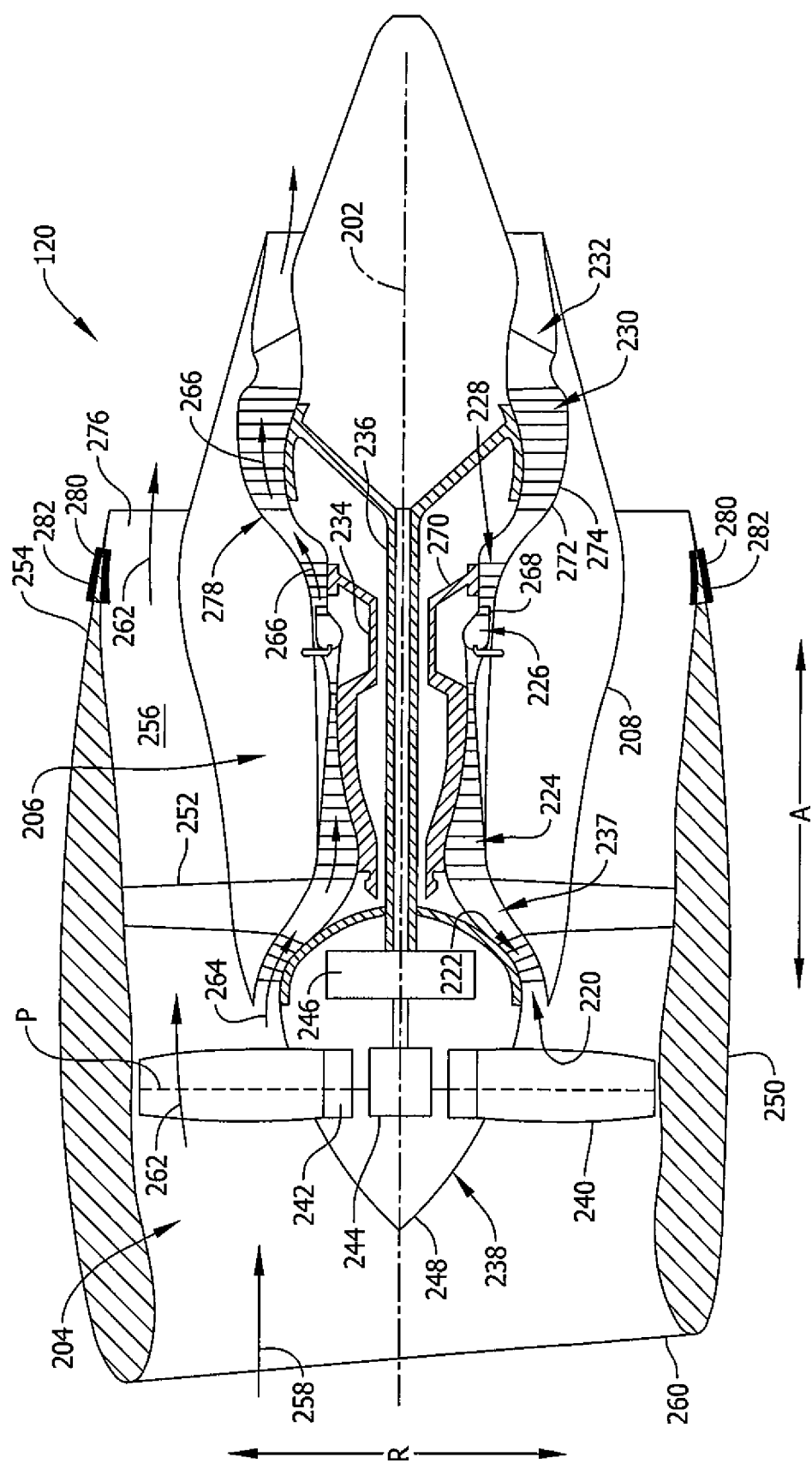
FIG. 2 is a schematic cross-sectional view of a gas turbine engine in accordance with an exemplary embodiment of the present disclosure.

FIG. 2 is a schematic cross-sectional view of gas turbine engine 120 in accordance with an exemplary embodiment of the present disclosure. In the example embodiment, gas turbine engine 120 is embodied in a high-bypass turbofan jet engine. As shown in FIG. 2, turbofan engine 120 defines an axial direction A (extending parallel to a rotational axis 202 of engine 120 provided for reference) and a radial direction R. In general, turbofan 120 includes a fan assembly 204 and a core turbine engine 206 disposed downstream from fan assembly 204.

In the example embodiment, core turbine engine 206 includes an approximately tubular outer casing 208 that defines an annular inlet 220. Outer casing 208 encases, in serial flow relationship, a compressor section including a booster or low pressure (LP) compressor 222 and a high pressure (HP) compressor 224; a combustion section 226; a turbine section including a high pressure (HP) turbine 228 and a power turbine or low pressure (LP) turbine 230; and a jet exhaust nozzle 232. A high pressure (HP) shaft or spool 234 drivingly connects HP turbine 228 to HP compressor 224. A low pressure (LP) shaft or spool 236 drivingly connects LP turbine 230 to LP compressor 222. The compressor section, combustion section 226, turbine section, and jet exhaust nozzle 232 together define a core air flowpath 237.

In the example embodiment, fan assembly 204 includes a variable pitch fan 238 having a plurality of fan blades 240 coupled to a disk 242 in a spaced apart relationship. Fan blades 240 extend radially outwardly from disk 242. Each fan blade 240 is rotatable relative to disk 242 about a pitch axis P by virtue of fan blades 240 being operatively coupled to a suitable pitch change mechanism (PCM) 244 configured to vary the pitch of fan blades 240. In other embodiments, pitch change mechanism (PCM) 244 is configured to collectively vary the pitch of fan blades 240 in unison. Fan blades 240, disk 242, and pitch change mechanism 244 are together rotatable about rotational axis 202 by LP shaft 236 across a power gear box 246. Power gear box 246 includes a plurality of gears for adjusting the rotational speed of fan 238 relative to LP shaft 236 to a more efficient rotational fan speed. Although described in the example embodiment, as including variable pitch fan 238 and power gear box 246, gas turbine engine 120 and fan assembly 204, in other embodiments, may not include one or both of variable pitch fan 238 and power gear box 246.

Disk 242 is covered by rotatable front hub 248 aerodynamically contoured to promote an airflow through the plurality of fan blades 240. Additionally, fan assembly 204 includes an annular fan casing or outer nacelle 250 that circumferentially surrounds fan 238 and/or at least a portion of core turbine engine 206. In the example embodiment, nacelle 250 is configured to be supported relative to core turbine engine 206 by a plurality of circumferentially-spaced outlet guide vanes 252. Moreover, a downstream section 254 of nacelle 250 may extend over an outer portion of core turbine engine 206 so as to define a fan bypass duct 256 therebetween.

During operation of turbofan engine 120, a volume of air 258 enters turbofan 120 through an associated inlet 260 of nacelle 250 and/or fan assembly 204. As volume of air 258 passes across fan blades 240, a first portion 262 of volume of air 258 is directed or routed into fan bypass duct 256 and a second portion 264 of volume of air 258 is directed or routed into core air flowpath 237, or more specifically into LP compressor 222. A ratio between first portion 262 and second portion 264 is commonly referred to as a bypass ratio. The pressure of second portion 264 is then increased as it is routed through high pressure (HP) compressor 224 and into combustion section 226, where it is mixed with fuel and burned to provide high energy exhaust gases 266.

High energy exhaust gases 266 are routed through HP turbine 228 where a portion of thermal and/or kinetic energy from high energy exhaust gases 266 is extracted via sequential stages of HP turbine stator vanes 268 that are coupled to outer casing 208 and HP turbine rotor blades 270 that are coupled to HP shaft or spool 234, thus causing HP shaft or spool 234 to rotate, which then drives a rotation of HP compressor 224. High energy exhaust gases 266 are then routed through LP turbine 230 where a second portion of thermal and kinetic energy is extracted from high energy exhaust gases 266 via sequential stages of LP turbine stator vanes 272 that are coupled to outer casing 208 and LP turbine rotor blades 274 that are coupled to LP shaft or spool 236, which drives a rotation of LP shaft or spool 236 and LP compressor 222 and/or rotation of fan 238.

High energy exhaust gases 266 are subsequently routed through jet exhaust nozzle 232 of core turbine engine 206 to provide propulsive thrust. Simultaneously, the pressure of first portion 262 is substantially increased as first portion 262 is routed through fan bypass duct 256 before it is discharged from a bypass fan flow discharge nozzle 276 of turbofan 120, also providing propulsive thrust. HP turbine 228, LP turbine 230, and jet exhaust nozzle 232 at least partially define a hot gas path 278 for routing high energy exhaust gases 266 through core turbine engine 206.

In various embodiments, a foldable bell-mouth scoop assembly 280 is positioned at an aft end of downstream section 254 of nacelle 250. In the example embodiment, bell-mouth scoop assembly 280 is shown in a stowed or folded position wherein a plurality of bell-mouth scoop panels circumscribe downstream section in an overlapping orientation. Bell-mouth scoop assembly 280 is configured to be repositioned to a deployed position (not shown in FIG. 2). In some embodiments, bell-mouth scoop assembly 280 is recessed in a stowage channel 282 such that a radially outer surface of bell-mouth scoop assembly 280 is flush with a radially outer surface of downstream section 254 when bell-mouth scoop assembly 280 is stowed.

Turbofan engine 120 is depicted in FIG. 1 by way of example only, and that in other exemplary embodiments, turbofan engine 120 may have any other suitable configuration including for example, a turboprop engine, a military purpose engine, and aeroderivative type engines used in marine or land-based applications.

Figure 3:
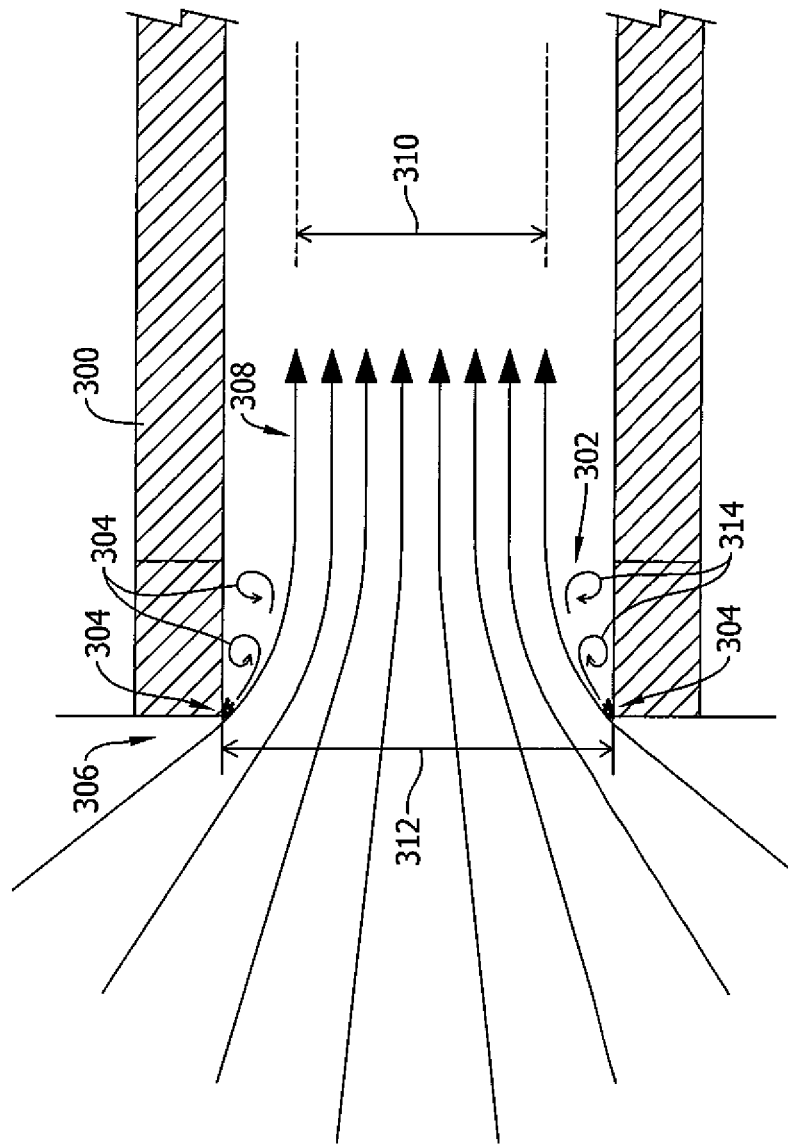
FIG. 3 is side elevation view of a duct having a sharp orifice entry throat.

FIG. 3 is side elevation view of a duct 300 having a sharp orifice entry throat 302. One characteristic of sharp orifice entry throat 302 is a sharp corner 304 circumscribing an entrance opening 306 of duct 300. A plurality of stream-lines 308 of flow entering opening 306 indicate that the flow is squeezed into a flow stream 308 that has a smaller diameter 310 (cross-sectional area) than a diameter 312 (cross-sectional area) of entrance opening 306. Additionally, eddies 314 form adjacent entrance opening 306 proximate corner nose section 304 and extending for a distance downstream of corner nose section 304. Such flow characteristics generate inefficiencies in the flow.

Figure 4:
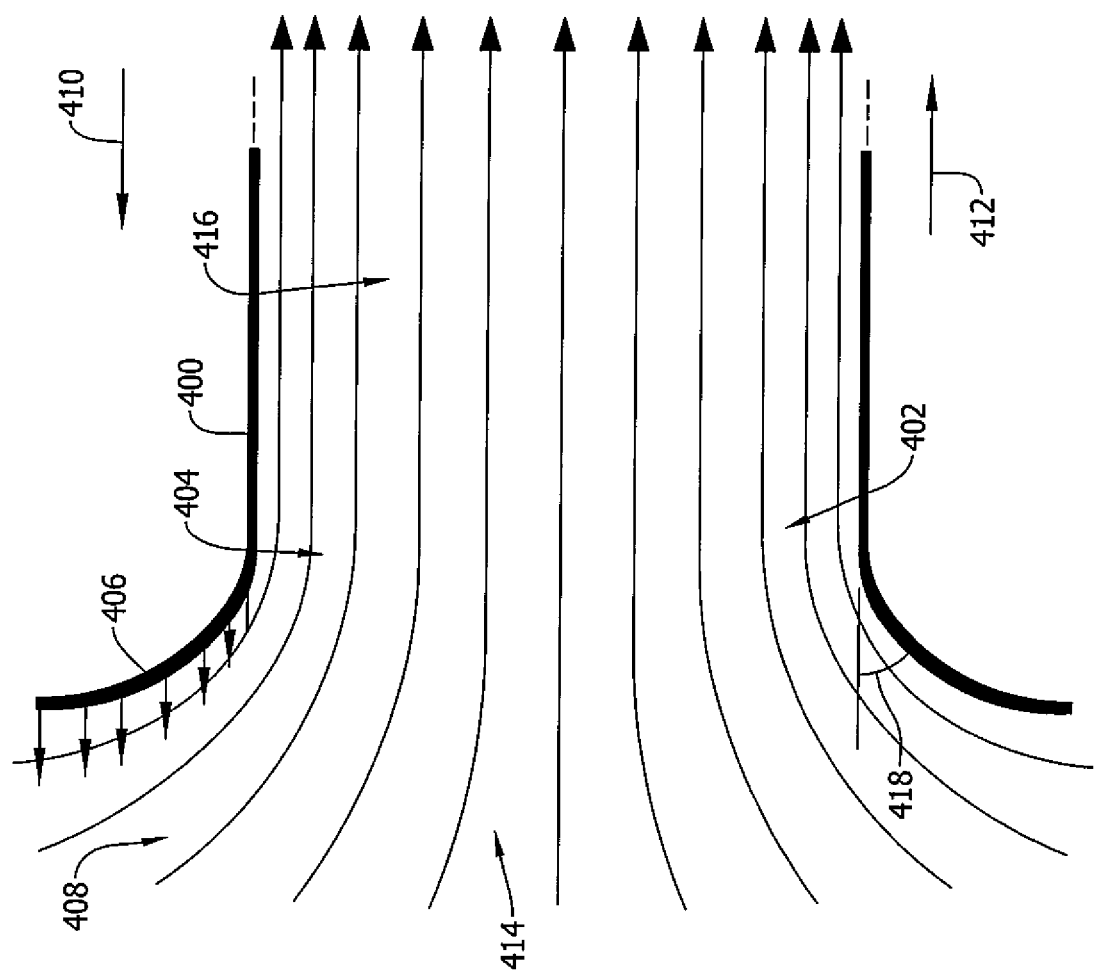
FIG. 4 is a side elevation view of a duct having a bell-mouth entry throat.

FIG. 4 is a side elevation view of a duct 400 having a bell-mouth entry throat 402. Stream lines 404 indicate that a bell-mouth structure 406 at an entrance opening 408 guides flow efficiently into duct 400 without permitting eddies to form or reducing the magnitude of eddies that may from time to time form in or downstream from entrance opening 408. Bell-mouth entry throat 402 is a form of convergent inlet used to direct air into the inlet of duct 400, which in various embodiments, may represent an entrance to a bypass fan flow discharge nozzle during a reverse thrust operation. The area of a convergent duct gets smaller as the air flows into the duct. A bell-mouth inlet is extremely efficient, and is used where there is little ram pressure available to force the air into the duct.

In various embodiments, duct 400 represents a bypass duct of a high bypass gas turbine engine of the type used on jet aircraft 100. During normal operation, air outside duct 400 is moving in direction 410 with respect to duct 400 and air inside duct 400 is also moving in direction 410. A bell-mouth structure 406 deployed during normal jet aircraft operation would present a large amount of drag. During reverse thrust operations, such as when the jet aircraft is attempting to slow down from a landing speed to a taxiing speed, flow outside of duct 400 is still moving in direction 410. However, due to, for example, the action of variable pitch fan blades 240 (shown in FIG. 2) flow through duct 400 is reversed to flow in direction 412. Bell-mouth structure 406 aids the reverse thrust procedure in at least two ways. First, bell-mouth structure 406 efficiently guides flow through entrance opening 408 and into duct 400. Secondly, bell-mouth structure 406 impedes the flow outside duct 400 by presenting a blunt face to the flow. Such "air-brake" action tends to add drag to engine 120 and jet aircraft 100 (both shown in FIG. 1).

In some embodiments, a cross-sectional area 414 of bell-mouth structure 406 is approximately two times an area 416 of duct 400, so that the air velocity entering bell-mouth structure 406 is relatively low (to reduce noise, turbulence and pressure drop), and gradually increases to the design velocity of duct 400. In various embodiments, an angle 418 of bell-mouth structure 406 is tapered approximately 45° as a balance between keeping bell-mouth structure 406 short while limiting turbulence or excessive pressure drop at entrance opening 408. The bell-mouth shape allows the maximum amount of air to be drawn into duct 400 with a minimum of loss. Bell-mouth structure 406 may be formed in differently shaped cross-sections, such as, but not limited to arcuate cross-sections, for example, elliptical, or linear cross-sections, for example, conical.

Figure 5:
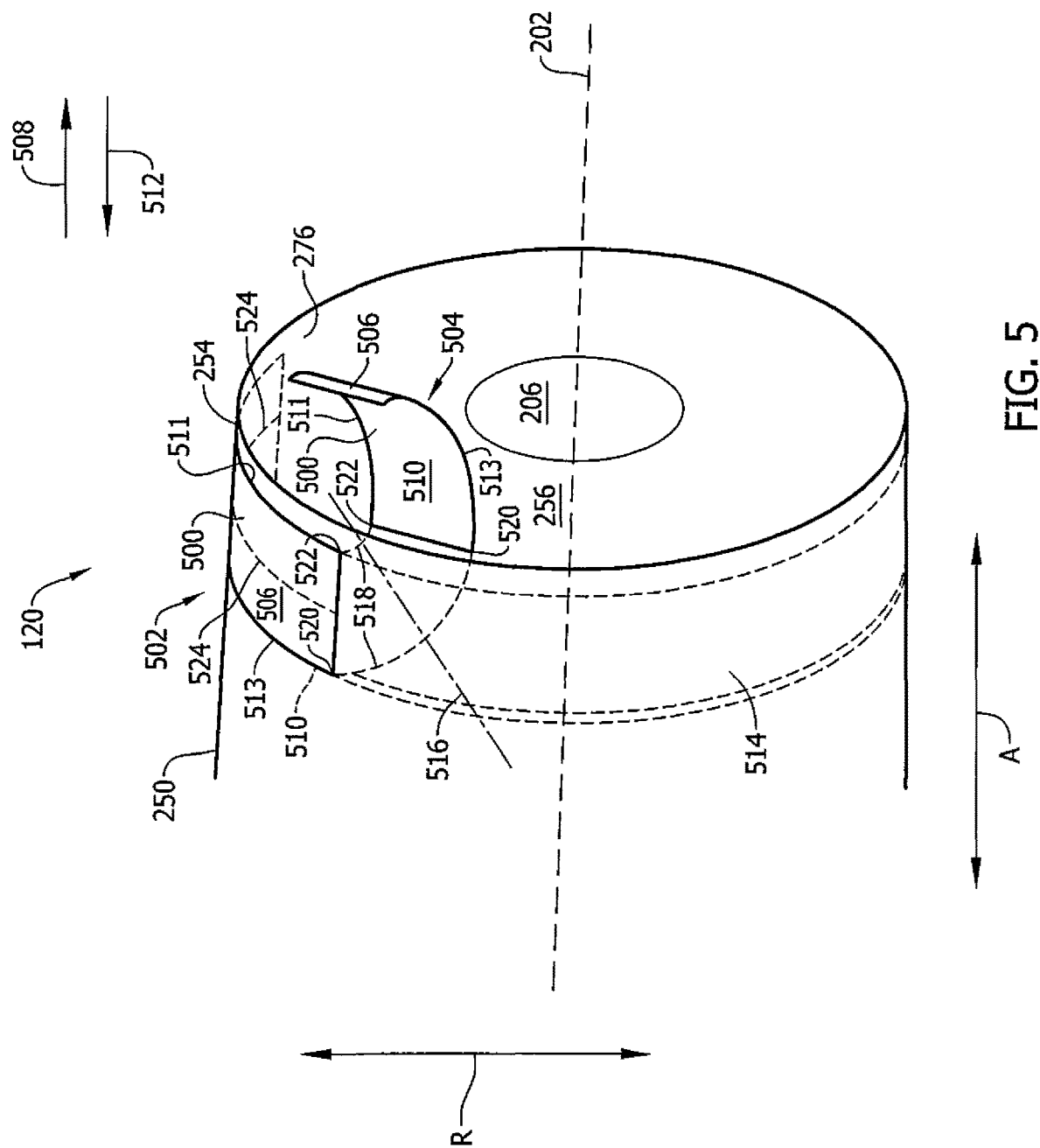
FIG. 5 is a perspective view of the gas turbine engine in accordance with an example embodiment of the present disclosure.

FIG. 5 is a perspective view of gas turbine engine 120 in accordance with an example embodiment of the present disclosure. In the example embodiment, FIG. 5 illustrates a single bell-mouth panel 500 of a bell-mouth structure (not shown in its entirety in FIG. 5) in a stowed position 502 and in a deployed position 504. Bell-mouth panel 500 is shown simultaneously in both positions for illustration of their relative positions only. Bell-mouth panel 500 includes a first surface 506 that faces radially outwardly when bell-mouth panel 500 is in stowed position 502 and faces generally radially inwardly and in an aft direction 508 in deployed position 504. Bell-mouth panel 500 also includes a second surface 510 that faces radially inwardly when bell-mouth panel 500 is in stowed position 502 and faces generally radially outwardly and in a forward direction 512 in deployed position 504. Bell-mouth panel 500 further includes first side edge 511 and a second side edge 513.

During stowage, for example, during takeoff, cruise, taxiing, and ground idle, bell-mouth panel 500 and a plurality of similar bell-mouth panels 500 (not shown in FIG. 5) are nested together about a circumference of downstream section 254 of nacelle 250. In stowed position 502, the nested bell-mouth panels 500 may be positioned within a stowage channel 514 that circumscribes downstream section 254 such that surface 506 is flush with a surface of nacelle 250. During deployment, an actuating mechanism (not shown in FIG. 5), such as, a hinge member (not shown in FIG. 5 for clarity) rotates about an axis of rotation 516. In various embodiments, the hinge member is embodied in a pin rotatably coupled to an actuator base (not shown in FIG. 5). This rotation and an intervening linkage arm (not shown in FIG. 5) between the actuating mechanism and bell-mouth panel 500 causes bell-mouth panel 500 to rise up from stowed position 502 and rotate approximately 90° to deployed position 504. Dotted lines 518 illustrate a line of travel of corners 520 and 522 of bell-mouth panel 500 during deployment, in one embodiment.

Bell-mouth panel 500 includes a panel longitudinal centerline 524 and is pivotably coupled to each at least one linkage arm (not shown in FIG. 5). In first stowed position 502, bell-mouth panel 500 is oriented with panel longitudinal centerline 524 and aligned about a circumference of flow discharge nozzle 276, in the second deployed position 504, bell-mouth panel 500 is configured to extend away from an outer surface 254 of flow discharge nozzle 276 with panel longitudinal centerline 524 aligned parallelly with nozzle centerline (202).

Figure 6:
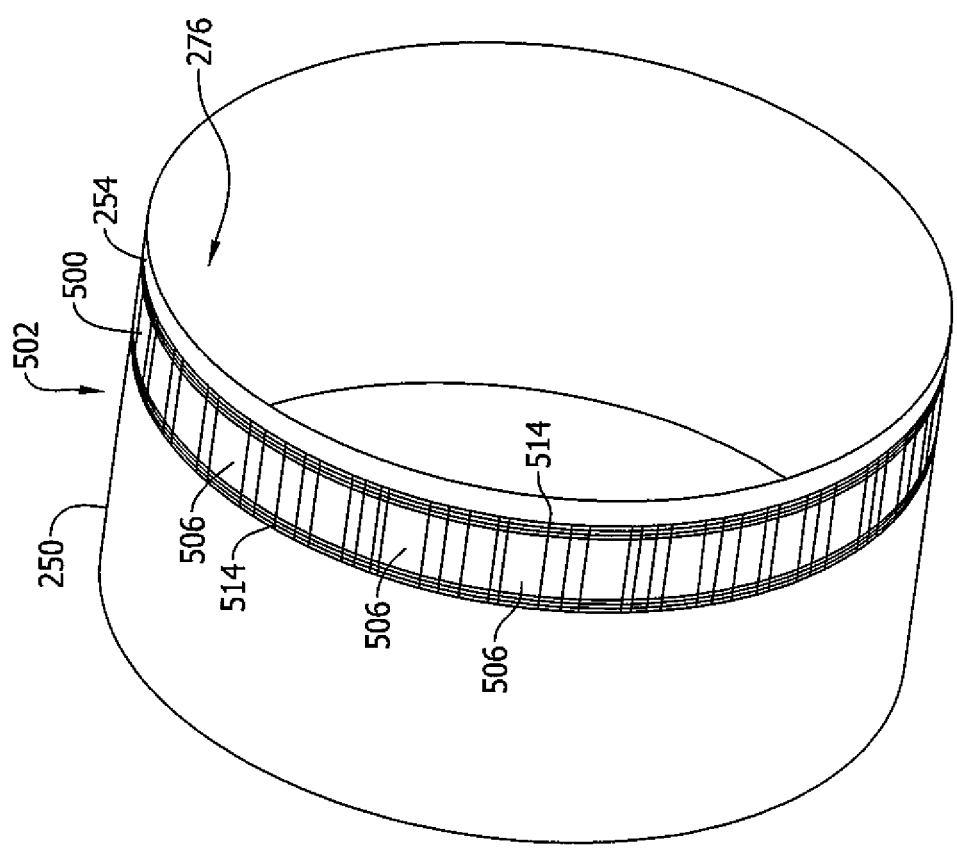
FIG. 6 is a perspective view of the downstream section of the nacelle shown in FIG. 2 with the plurality of bell-mouth panels in the stowed position.

FIG. 6 is a perspective view of downstream section 254 of nacelle 250 (both shown in FIG. 2) with plurality of bell-mouth panels 500 in stowed position 502. In the example embodiment, plurality of bell-mouth panels 500 are nested together or overlapping each other in stowage channel 514. In the example embodiment, core turbine engine 206, LP turbine 230, and an aft center body are not shown for clarity.

Figure 7:
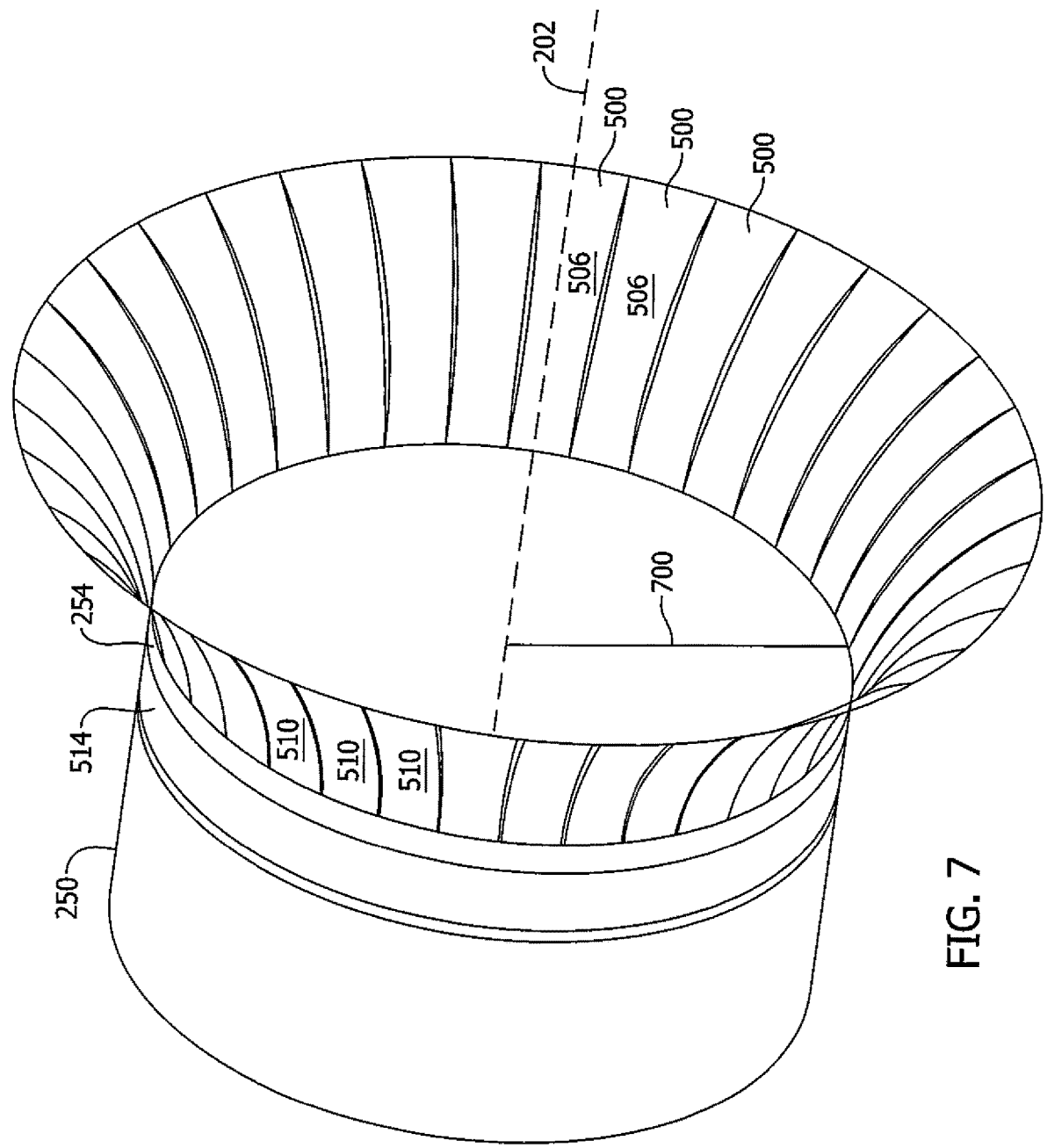
FIG. 7 is a perspective view of the downstream section of the nacelle both shown in FIG. 2 with the plurality of bell-mouth panels in the deployed position.

FIG. 7 is a perspective view of downstream section 254 of nacelle 250 (both shown in FIG. 2) with plurality of bell-mouth panels 500 in deployed position 504. In the example embodiment, plurality of bell-mouth panels 500 are abutted along respective first side edge 511 and second side edge 513 of adjacent bell-mouth panels 500. In the example embodiment, because bell-mouth panels 500 fit into a circumferential stowage channel 514, bell-mouth panels 500 form a bell-mouth structure having a circular cross-section rather than, for example, an elliptical or conical cross-section. A curve radius of bell-mouth panels 500 approximately equals a radius 700 of downstream section 254 of nacelle 250.

Figure 8:
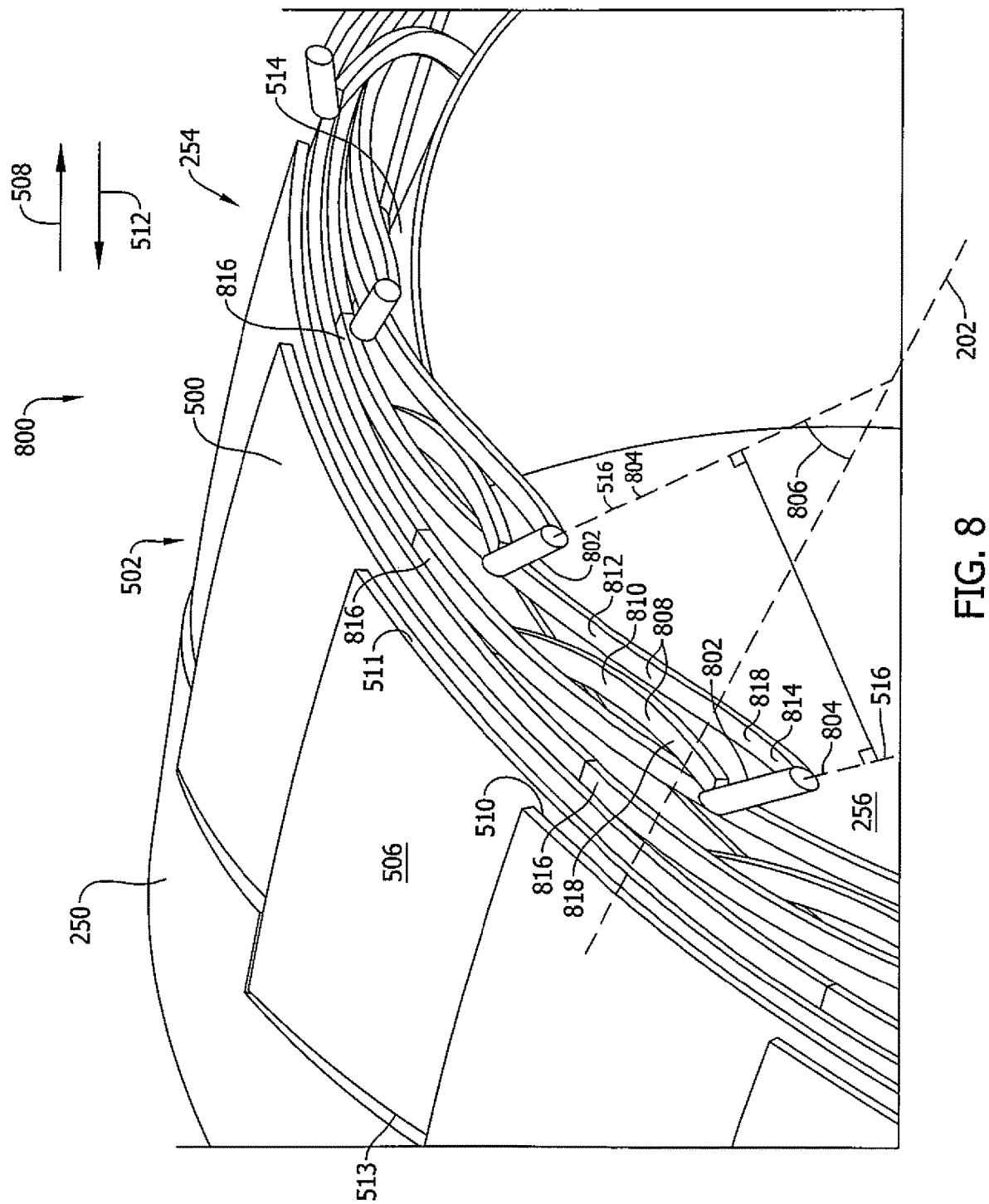
FIG. 8 is a perspective view of a bell-mouth assembly in accordance with an example embodiment of the present disclosure.

FIG. 8 is a perspective view of a bell-mouth scoop assembly 800 in accordance with an example embodiment of the present disclosure. In the example embodiment, bell-mouth scoop assembly 800 is formed with or coupled to a downstream section 254 of nacelle 250 (both shown in FIG. 2). Bell-mouth scoop assembly 800 is illustrated with plurality of bell-mouth panels 500 in stowed position 502. Bell-mouth scoop assembly 800 includes a plurality of hinge members 802 spaced circumferentially about downstream section 254. Each hinge member 802 of plurality of hinge members 802 includes a hinge axis of rotation 804. In the example embodiment, hinge axes of rotation 804 are parallel with respect to each other, radially displaced from rotational axis 202, and offset from rotational axis 202 by an angle 806. In various embodiments, hinge axes of rotation 804 are not parallel with respect to each other and may be free to rotate about a pivot axis to maintain mechanical alignment or facilitate rotation of hinge members 802. Plurality of hinge members 802 are positionally fixed with freedom to rotate by an actuator base (not shown in FIG. 8). The actuator base forms a part of or is coupled to downstream section 254.

One or more linkage arms 808 are coupled to respective hinge members 802. In one embodiment, linkage arms 808 are fixedly coupled to respective hinge members 802. In other embodiments, linkage arms 808 are coupled to respective hinge members 802, such that a relative angle between linkage arms 808 and respective hinge members 802 is variable. In the example embodiment, two linkage arms are illustrated, a forward linkage arm 810 and an aft linkage arm 812. Each linkage arm includes a hinge connection end 814 and a bell-mouth panel connection end 816. A linkage arm body 818 extends between hinge connection end 814 and bell-mouth panel connection end 816 of each respective forward linkage arm 810 and aft linkage arm 812. In one embodiment, each linkage arm body 818 of the plurality of forward linkage arms 810 is substantially identical to each other linkage arm body 818 of the plurality of forward linkage arms 810 and each linkage arm body 818 of the plurality of aft linkage arms 812 is substantially identical to each other linkage arm body 818 of the plurality of aft linkage arms 812. In other embodiments, plurality of forward linkage arms 810 and the plurality of aft linkage arms 812 may be shaped differently to, for example, avoid obstacles in the path of one or more of the linkage arms 810, 812, or to account for varying loading about the circumference of downstream section 254.

Figure 9:
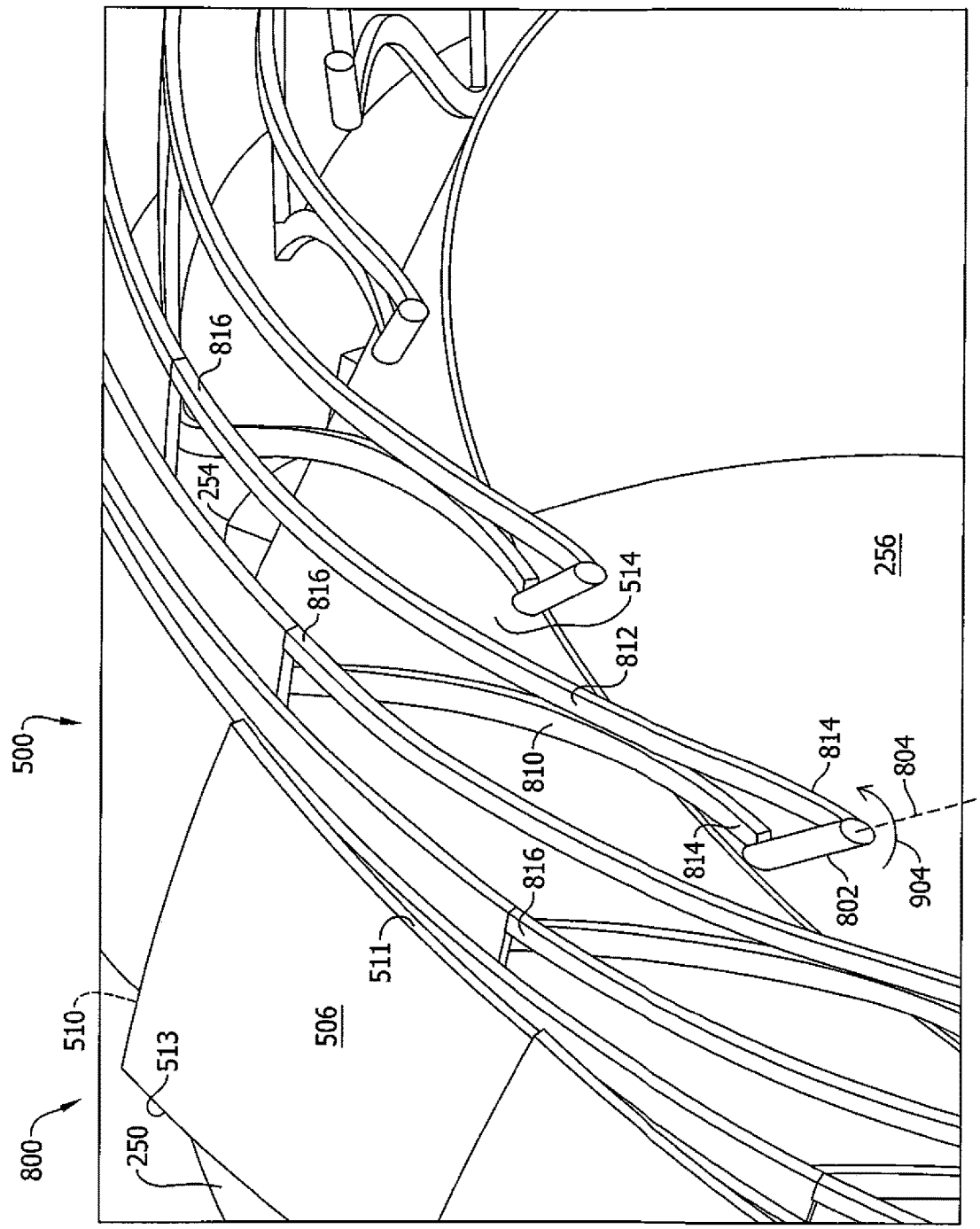
FIG. 9 is a perspective view of the bell-mouth assembly in an intermediate position between the stowed position and the deployed position both shown in FIG. 5.

FIG. 9 is a perspective view of bell-mouth scoop assembly 800 in an intermediate position 902 between stowed position 502 and deployed position 504 (both shown in FIG. 5). In the example embodiment, plurality of hinge members 802 have rotated about hinge axis of rotation 804 a first amount in a counterclockwise direction 904. Plurality of forward linkage arms 810 and aft linkage arms 812 have consequently rotated with plurality of hinge members 802 such that plurality of respective bell-mouth panel connection ends 816 translate arcuately away from downstream section 254 and stowage channel 514.

Figure 10:
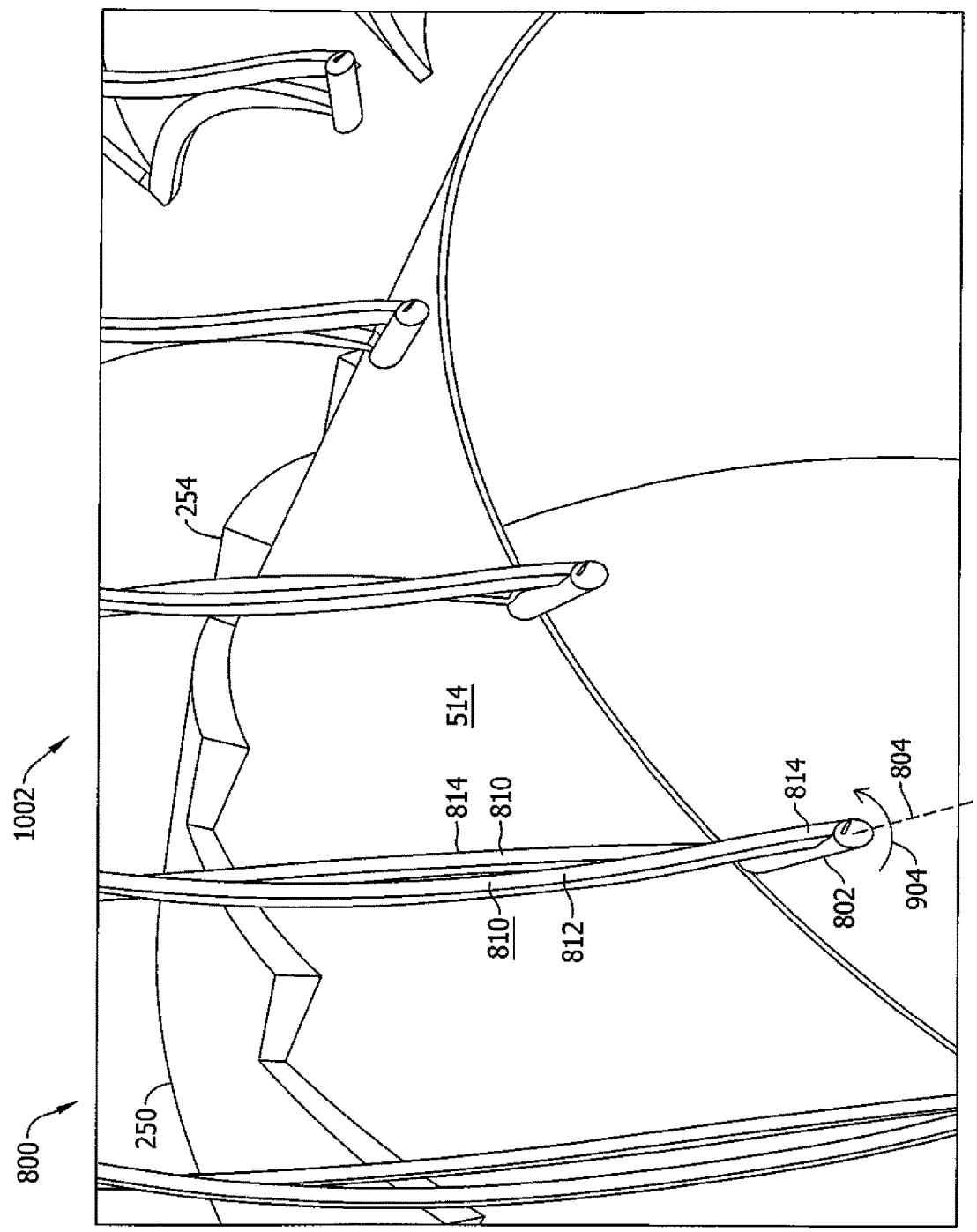
FIG. 10 is a perspective view of the bell-mouth assembly in another intermediate position between the stowed position and the deployed position both shown in FIG. 5.

FIG. 10 is a perspective view of bell-mouth scoop assembly 800 in another intermediate position 1002 between stowed position 502 and deployed position 504 (both shown in FIG. 5). In the example embodiment, plurality of hinge members 802 have rotated about hinge axis of rotation 804 a second amount in counterclockwise direction 904. Plurality of forward linkage arms 810 and aft linkage arms 812 have consequently rotated with plurality of hinge members 802 such that plurality of forward linkage arms 810 and aft linkage arms 812 extend approximately radially outward away from downstream section 254 and stowage channel 514.

Figure 11:
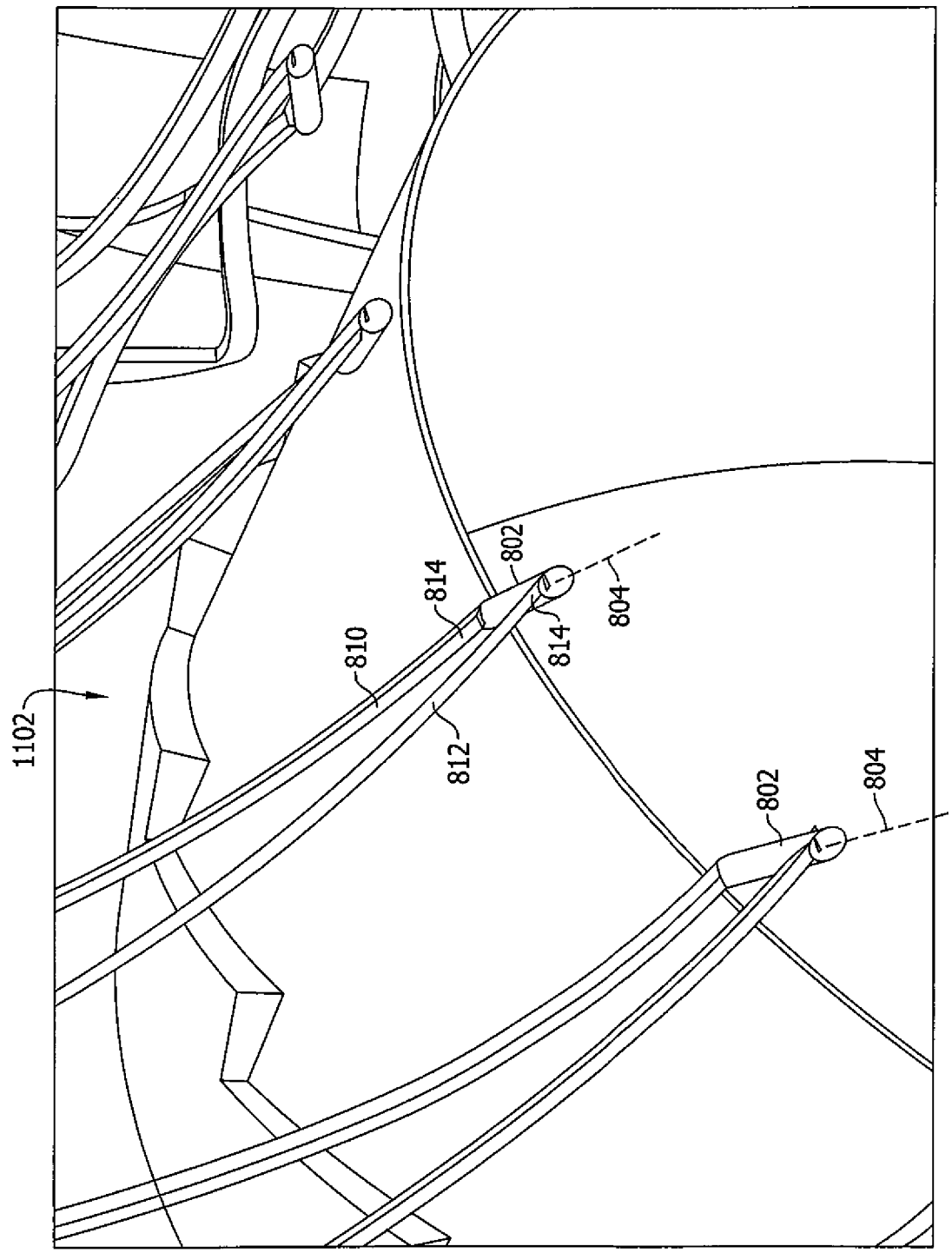
FIG. 11 is a perspective view of the bell-mouth assembly in another intermediate position between the stowed position and the deployed position both shown in FIG. 5.
Figure 12:
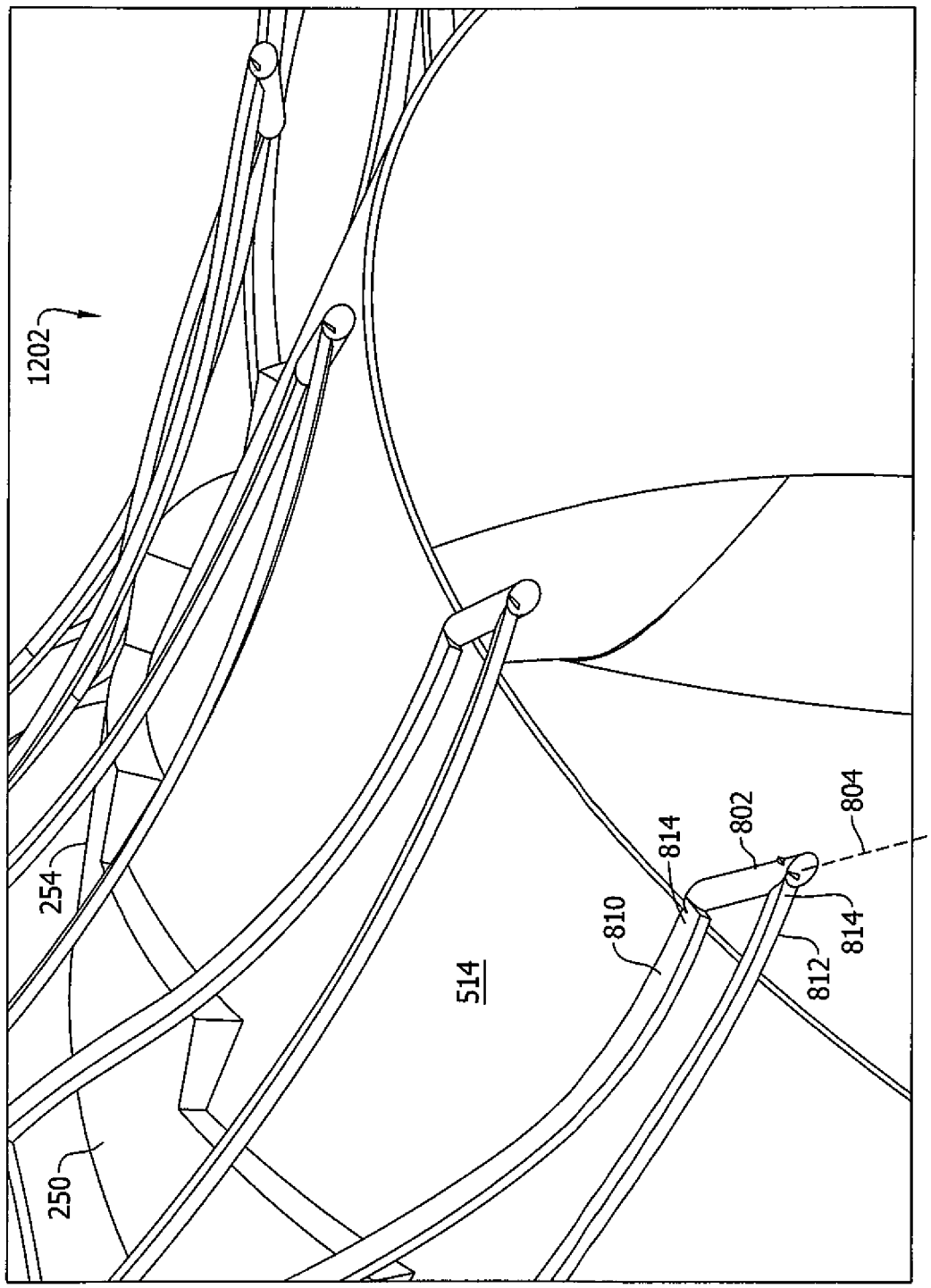
FIG. 12 is a perspective view of bell-mouth assembly in another intermediate position between the stowed position and the deployed position both shown in FIG. 5.

FIG. 11 is a perspective view of bell-mouth scoop assembly 800 in another intermediate position 1102 between stowed position 502 and deployed position 504 (both shown in FIG. 5). FIG. 12 is a perspective view of bell-mouth scoop assembly 800 in another intermediate position 1202 between stowed position 502 and deployed position 504 (both shown in FIG. 5). In the example embodiment, plurality of forward linkage arms 810 and aft linkage arms 812 have rotated with plurality of hinge members 802 past the radially extending position.

Figure 13:
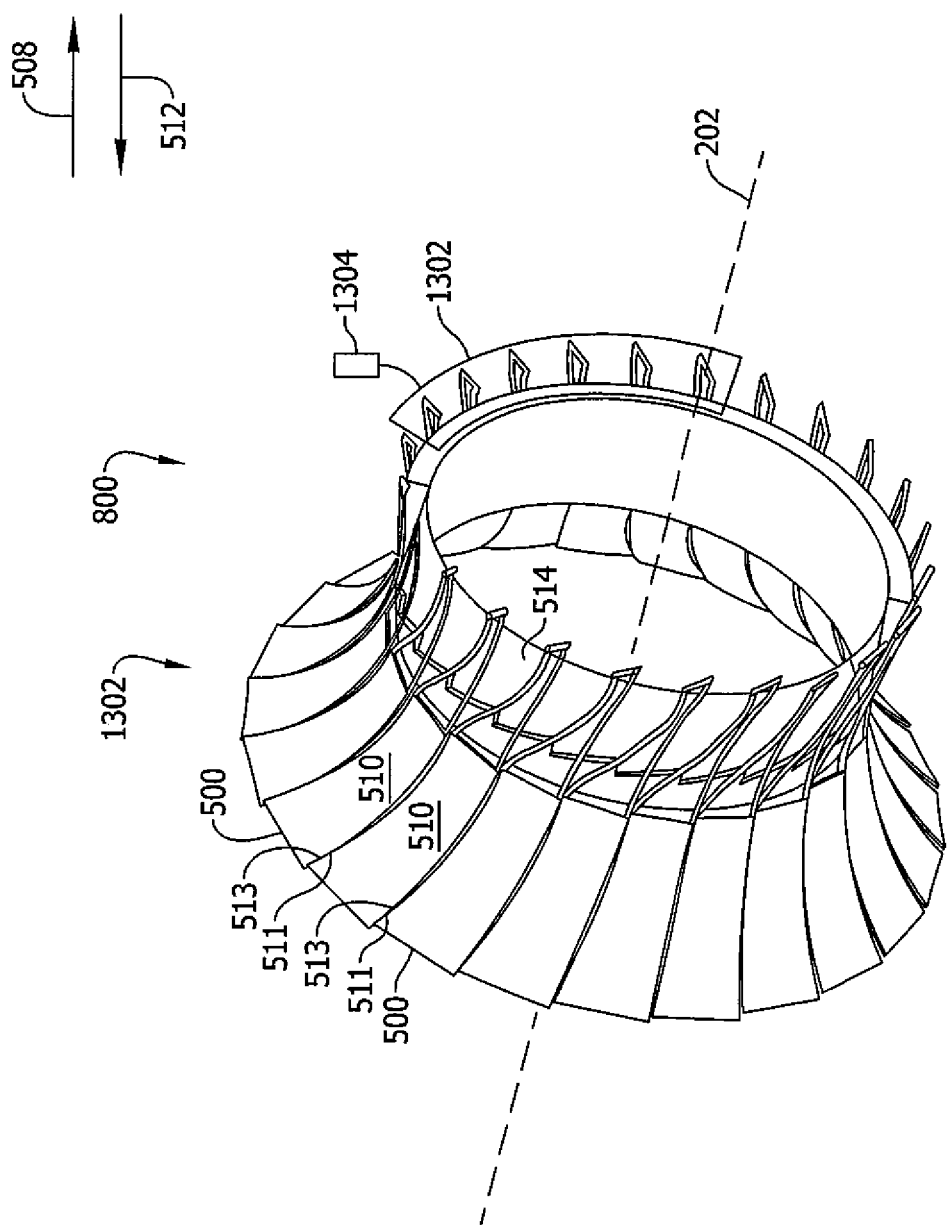
FIG. 13 is a perspective view of the bell-mouth assembly in the deployed position as shown in FIG. 5.

FIG. 13 is a perspective view of bell-mouth scoop assembly 800 in deployed position 504 (both shown in FIG. 5). In the example embodiment, hinge members 802 have completed their rotation, first side edges 511 and second side edges 513 are abutted with respect to each other to form a seal between panels 500. An actuator base 1302 is formed with or coupled to downstream section 254 and is configured to maintain an angular position of hinge member 802 with respect to rotational axis 202 while permitting hinge member 802 to rotate about axis 804. Actuator base 1302 may include an actuating device 1304 configured to provide a motive force causing one or more of the plurality of hinge members 802 to rotate. In various embodiments, some of the plurality of hinge members 802 may be driven by actuating device 1304 while others of the plurality of hinge members 802 may only provide rotation support. Moreover, the pluralities of panels, 500, hinge members 802, forward linkage arms 810, and aft linkage arms 812 do not have to be in one-to-one correspondence numerically. In various embodiments, the pluralities of panels, 500, hinge members 802, forward linkage arms 810, and aft linkage arms 812 may be ganged together such that several of the number of the pluralities of panels, 500, hinge members 802, forward linkage arms 810, and aft linkage arms 812 may correspond to lesser or greater numbers of the associated pluralities of panels, 500, hinge members 802, forward linkage arms 810, and aft linkage arms 812.

Figure 14:
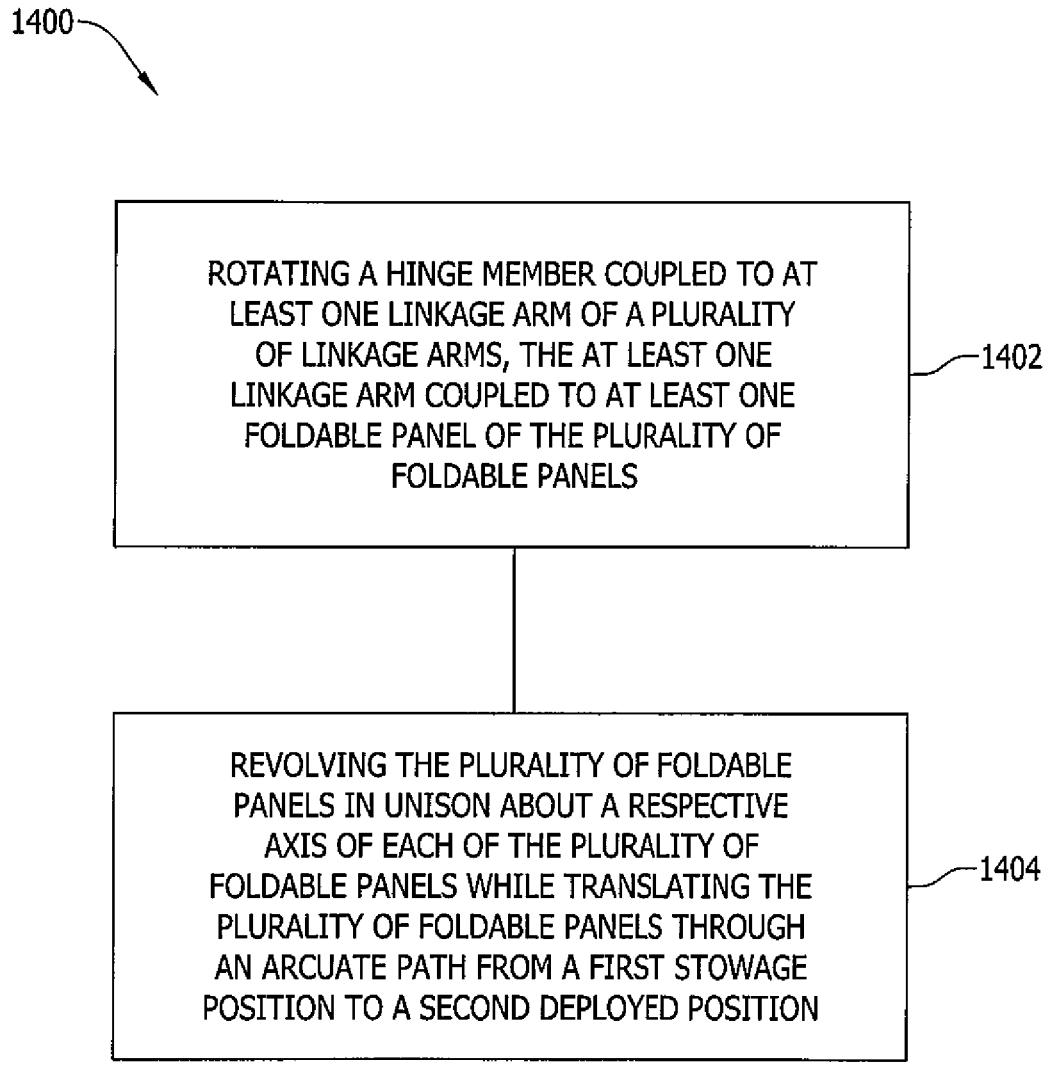
FIG. 14 is a flow diagram of a method in accordance with an example embodiment of the present disclosure.

FIG. 14 is a flow diagram of a method 1400 of deploying a foldable bell-mouth scoop in accordance with an example embodiment of the present disclosure. In the example embodiment, the bell-mouth scoop includes a plurality of foldable panels that when stowed form an overlapping circumferential band of foldable panels about a duct having a duct opening and when deployed form a bell-mouth about the opening. The method includes rotating 1402 a hinge member coupled to at least one linkage arm of a plurality of linkage arms, the at least one linkage arm coupled to at least one foldable panel of the plurality of foldable panels, and revolving 1404 the plurality of foldable panels in unison about a respective axis of each of the plurality of foldable panels while translating the plurality of foldable panels through an arcuate path from a first stowage position to a second deployed position.

The above-described bell-mouth scoop devices and system provide an efficient method for providing a stowable bell-mouth at a duct inlet. Specifically, the above-described foldable bell-mouth includes a plurality of leafs or panels that are stowed along a circumferential surface of a duct to maintain an aerodynamic integrity of the surface during a first mode of operation. During a second mode of operation, the leafs or panels may be deployed to a second position to guide a fluid efficiently into the duct.

The above-described embodiments of a method and system of a foldable and stowable bell-mouth scoop provide an efficient and practical manner of improving the reverse thrust capability of an aircraft engine. In the stowed position, the bell-mouth structure is out of the stream of air passing along the outer surface of a nacelle of the engine. During deployment, a plurality of leafs or panels, that when fully deployed form the bell-mouth scoop structure rotate into position guided by hinge members and intervening linkage arms. When deployed the leafs or panels extend into the stream of air passing along the outer surface of a nacelle of the engine as an airbrake while the bell-mouth scoop structure guides the air entering the fan duct of the nacelle. As a result, the methods and systems described herein facilitate improving the reverse thrust characteristics of the aircraft engine in a cost-effective and reliable manner.

Exemplary embodiments of stowable bell-mouth systems are described above in detail. The stowable bell-mouth systems, and methods of operating such systems and component devices are not limited to the specific embodiments described herein, but rather, components of the systems and/or steps of the methods may be utilized independently and separately from other components and/or steps described herein. For example, the methods may also be used in combination with other systems requiring a smooth transition from a non-ram fluid stream to a fan or compressor intake stream, and are not limited to practice with only the systems and methods as described herein. Rather, the exemplary embodiment can be implemented and utilized in connection with many other machinery applications that are currently configured to receive and accept non-ram fluid streams.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A bell-mouth scoop assembly for a flow discharge nozzle, the flow discharge nozzle defining an axial direction, a radial direction, and a circumferential direction and comprising a flow discharge nozzle centerline extending in the axial direction which is a direction of flow into or out of the flow discharge nozzle, the bell-mouth scoop assembly comprising:
   an actuator comprising:
      a plurality of hinge members configured to rotate in unison about a respective hinge axis of rotation from a first stowed position to a second deployed position; and
      at least one linkage arm extending outwardly from at least one of the plurality of hinge members, said linkage arm comprising a first hinge connection end, a second distal end, and a body extending therebetween; and
   a bell-mouth panel comprising a panel longitudinal centerline and pivotably coupled to each at least one linkage arm,
   wherein, in the first stowed position, said bell-mouth panel is oriented with the panel longitudinal centerline aligned with the circumferential direction about a circumference of said flow discharge nozzle, and
   wherein, in the second deployed position, said bell-mouth panel is configured to extend away from an outer surface of said flow discharge nozzle with the panel longitudinal centerline having a larger component in the axial direction than in the radial direction or the circumferential direction.

2. The assembly of claim 1, wherein the hinge axis of rotation is radially displaced from the nozzle centerline and positioned at an angle with respect to the nozzle centerline.

3. The assembly of claim 2, wherein the angle between each hinge axis of rotation and the nozzle centerline are constant during operation between the first stowed position and the second deployed position.

4. The assembly of claim 1, wherein a number of said plurality of hinge members is less than a number of said at least one linkage arm, said at least one linkage arms ganged onto said plurality of hinge members.

5. The assembly of claim 1, wherein said actuator comprises a plurality of actuating devices, each actuating device of the plurality of actuating devices coupled to a single respective hinge member.

6. The assembly of claim 1, wherein said actuator comprises a plurality of actuating devices, each actuating device of the plurality of actuating devices coupled to more than one hinge member of the plurality of hinge members.

7. The assembly of claim 1, wherein in the first stowed position, a radially outer extent of said bell-mouth panels is flush with said radially outer surface.

8. The assembly of claim 1, wherein rotation of the plurality of hinge members about its respective hinge axis of rotation from the first stowed position to the second deployed position causes at least one of a respective bell-mouth panel to rotate from the first stowed position to a second deployed position.

9. The assembly of claim 1, wherein said flow discharge nozzle further comprises a radially outer surface and a circumferential stowage channel configured to receive said bell-mouth scoop assembly.

10. The assembly of claim 1, wherein said bell-mouth panel is configured to conform to a radially outer surface of said flow discharge nozzle.

11. The assembly of claim 1, wherein the hinge axis of rotation is directed at an angle with respect to the circumferential direction.

12. A turbofan engine defining an axial direction, a radial direction, and a circumferential direction, the turbofan engine comprising:
   a core turbine engine configured to generate a stream of high energy exhaust gases;
   a fan powered by a power turbine driven by the high energy exhaust gases;
   a fan bypass duct at least partially surrounding said core turbine engine and said fan; and
   a bell-mouth scoop assembly coupled to an aft end of said fan bypass duct, the bell-mouth scoop assembly comprising:
      a plurality of hinge members configured to rotate in unison about a respective hinge axis of rotation from a first stowed position to a second deployed position;
      at least one linkage arm extending outwardly from at least one of the plurality of hinge members, said linkage arm comprising a first hinge connection end, a second panel connection end, and a body extending therebetween; and
      a bell-mouth panel comprising a panel longitudinal centerline and pivotably coupled to each at least one linkage arm,
      wherein, in the first stowed position, said bell-mouth panel is configured to conform to an outer surface of said fan bypass duct with the panel longitudinal centerline aligned with the circumferential direction about a circumference of said fan bypass duct, and
      wherein, in the second deployed position, said bell-mouth panel is configured to extend away from said outer surface of said fan bypass duct with the panel longitudinal centerline having a larger component in the axial direction than in the radial direction or the circumferential direction.

13. The assembly of claim 12, wherein the hinge axis of rotation is radially displaced from the rotational axis of the turbofan engine and positioned at an angle with respect to the rotational axis.

14. The assembly of claim 13, wherein the angle between each hinge axis of rotation and the rotational axis of the turbofan engine is constant during operation between the first stowed position and the second deployed position.

15. The assembly of claim 12, wherein a number of said plurality of hinge members is less than a number of said at least one linkage arm, said at least one linkage arms ganged onto said plurality of hinge members.

16. The assembly of claim 12, wherein said actuator comprises a plurality of actuating devices, each actuating device of the plurality of actuating devices coupled to a single respective hinge member.

17. The assembly of claim 12, wherein the hinge axis of rotation is directed at an angle with respect to the circumferential direction.

\* \* \* \* \*